United States Patent [19]
Rittmann et al.

[11] 3,954,026
[45] May 4, 1976

[54] WHEEL DRIVE MECHANISM

[75] Inventors: Udo Rittmann; Edgar Wahnemuehl, all of Muelheim (Ruhr), Germany

[73] Assignee: Clark Equipment Company, Buchanan, Mich.

[22] Filed: Dec. 6, 1974

[21] Appl. No.: 530,112

[52] U.S. Cl. ................................. 74/784; 180/43 B
[51] Int. Cl.² ............................................ F16H 3/44
[58] Field of Search ................... 74/784, 762, 766; 180/43 B

[56] References Cited
UNITED STATES PATENTS

| | | | |
|---|---|---|---|
| 743,053 | 11/1908 | Ball | 74/784 |
| 1,646,127 | 10/1927 | Tuttle | 74/784 |
| 2,330,198 | 9/1943 | Banker | 74/784 |
| 2,336,459 | 12/1943 | Banker | 74/784 |
| 3,737,000 | 6/1973 | Knobloch et al. | 180/43 B |

*Primary Examiner*—Samuel Scott
*Assistant Examiner*—Wesley S. Ratliff, Jr.
*Attorney, Agent, or Firm*—Ernst H. Ruf

[57] ABSTRACT

A single wheel drive mechanism wherein the drive motor is mounted on a vehicle support member and has its output shaft axially aligned with a driving shaft that is journaled in a gear box housing that is also attached to the support member, with a rotary gear case being rotatably mounted on a stationary spindle extending outwardly from the gear box housing, said gear case including an internal ring gear that is in mesh with gear means rotatably journaled in the gear box housing and which is also in mesh with a drive gear on the driving shaft. A friction brake means is interposed between the support member and the gear box housing, with a rotatable member thereof also serving as the coupling means between the drive shaft and the motor output shaft.

10 Claims, 2 Drawing Figures

WHEEL DRIVE MECHANISM

BACKGROUND OF THE INVENTION

1. Field of the Invention

The field of art to which this invention pertains includes that of gear reduction drives; more specifically, to drive mechanisms for rotating a member such as for example a vehicle wheel.

2. Description of the Prior Art

Single wheel drives for vehicles are well-known and can generally be divided into planetary gear drives and cone pulley drives. Both of these drives present a number of disadvantages in that they are generally bulky and project axially outwardly from the vehicle whose wheels they are to drive. The sometimes excessively long axial dimensions of these drive units are due to their structural elements which include the driving motor, service and parking brakes along with multi-step reduction gearing. The excessive space occupied by many of the prior art units is of particular disadvantage when these wheel drives are used for fork lift trucks and the like where overall width dimensions are preferably kept to an absolute minimum in order to maximize maneuverablilty.

It is therefore desirable to provide wheel drive mechanisms that will not only have increased life expectancies over the prior art units, but also permit the entire gearing unit to be mounted within the wheel rim; permit ready servicing of the integral brake mechanism; are relatively economical to manufacture; and generally characterized by simplicity and ease of assembly and disassembly.

SUMMARY OF THE INVENTION

This invention solves the previously-mentioned problems and meets the previously-discussed criteria. A drive motor is mounted on one side of a vehicle support member and has its output shaft extending through a support member opening into a gear box housing which is attached to the other side of the support member and includes a stationary outwardly extending spindle. A driving shaft is journaled in the gear box housing and has a first portion thereof within the housing and a second portion extending outwardly therefrom toward the drive motor output shaft. Interposed between the support member and the gear box housing is a friction brake means, with a rotatable member thereof also serving as a coupling means between the drive shaft second portion and the motor output shaft. Preferably, the rotatable member is either the drum of an internally expanding shoe type of brake, or the disc of a caliper type disc brake with the motor output shaft and drive shaft second portion extending into a bore in the drum or disc hub and drivingly engaging the drum or disc hub. An annular locating ring within the drum or disc bore is confined between the opposing end faces of the motor output shaft and the drive shaft second portion and functions to maintain the brake drum or disc in the correct axial location relative to the output and driving shafts. A rotary gear case is rotatably mounted on the spindle and includes a wheel mounting means and an internal ring gear. Rotatably journaled in the gear box housing is a gear means which is in mesh with both a drive gear on the driving shaft and the rotary gear case internal ring gear, thus permitting gear reduction between the drive motor and the rotary gear case upon which the wheel itself is mounted. Either cluster or planetary gearing can be utilized.

An essential part of the present invention is that the rotatable member of the friction brake means is arranged in a space-saving manner on the motor output shaft and the driving shaft and thus serves simultaneously as a coupling member. The arrangement of the rotatable brake member in the manner described makes it possible to vent and adjust the brake from the inside of the vehicle without demounting the entire mechanism. In addition, assembly and maintenance accessibility are greatly enhanced.

Other features and advantages of the invention will become more readily understood by persons skilled in the art when following the detailed description in conjunction with the drawings.

DESCRIPTION OF THE PREFERRED EMBODIMENTS

Figure 1:
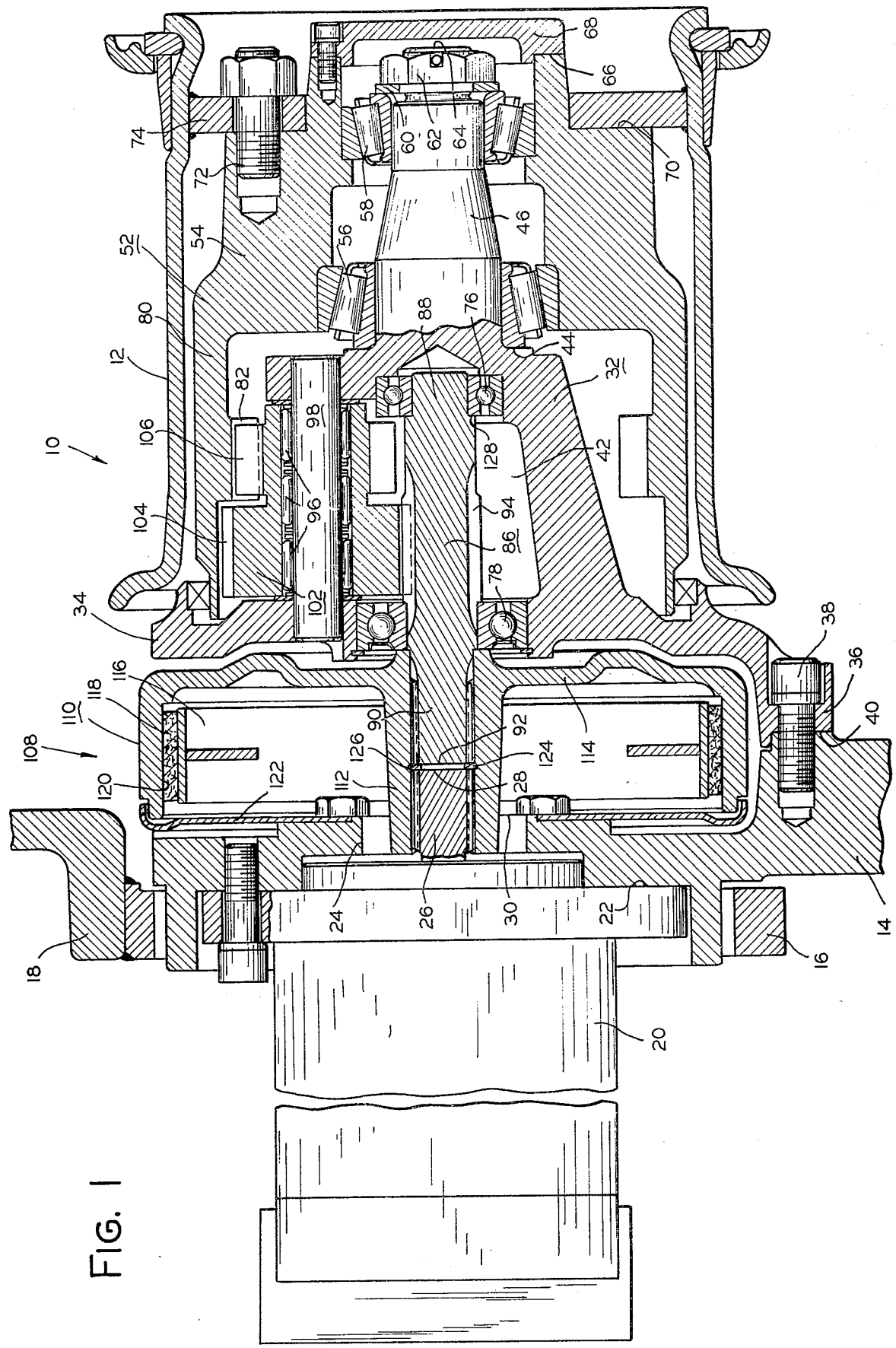
FIG. 1 is a cross-sectional view of the wheel drive mechanism of this invention comprising a concentric arrangement of structural elements wherein a motor is arranged to drive a single wheel through a multi-step reduction gear.

Referring now to FIG. 1, there is shown a wheel drive mechanism, generally denoted by numeral 10, which may be affixed, for example, to the frame member of a vehicle such as a fork lift truck.

Specifically, FIG. 1 shows wheel drive mechanism 10 as driving the right front wheel 12 of a fork lift truck having a frame or support member 14, with frame member 14 also having a mounting trunnion 16 that supports a lifting device 18.

A drive motor 20, preferably of the hydraulic type, is securely mounted to the inner side 22 of support member 14 and has its output shaft 26 extending through a support member opening 24. Motor shaft end face 28 is located axially outwardly from an outer side portion 30 of support member 14.

A gear box housing 32, has its inner end portion 34 merging into a partially annular flange member 36 that is securely bolted, via bolts 38 (only one of which is shown) to another outer side portion 40 of support member 14. As may readily be ascertained from FIG. 1, at least a portion of gear box housing inner portion 34 is not attached to support member 14.

Gear box housing 32, which has a central cavity 42 whose function will be described in more detail later, also has an outer end portion 44 that narrows down to an outwardly extending fixed spindle 46 that is coaxial with motor output shaft 26.

A rotary gear case 52 has a first hub portion 54 surrounding and rotatably mounted on spindle 46 by means of bearings 56 and 58, with the latter being held (and holding gear case 52 against outward axial movement) in place by means of a washer 60 and nut 62 on spindle threaded portion 64. The outer annual end face 66 of hub portion 54 is closed off by means of a cover 68 which is threadably secured thereto. In addition, first hub portion annular end face 70 contains a plurality of studs 72 (only one of which is shown) that serve as locating and attachment members for web 74 of wheel 12.

Rotary gear case 52 also includes a second hub portion 80 that extends axially inwardly from first hub portion 54 and substantially surrounds gear box housing 32. Rotary gear case second hub portion 80 includes annular internal ring gear 82 whose function will be described in more detail later.

A driving shaft 86 is rotatably journalled by bearings 76 and 78 within gear box housing central cavity 42, with driving shaft 86 being coaxial with motor output shaft 26. Driving shaft 86 has a first portion 88 located within central cavity 42 and a second portion 90 extending axially outwardly therefrom for a distance sufficient that its end face 92 almost abuts end face 28 of motor output shaft 26. Driving shaft first portion 88 either has integrally therewith or attached thereto a drive gear 94 whose function will be described in more detail shortly.

Also journalled within gear box housing central cavity 42, via bearings 96 on shaft 98, is a cluster or multi-step gear 102 having first and second integrally formed gears 104 and 106 which rotate in unison, with gear 104 being in mesh with drive gear 94 and gear 106 being in mesh with internal ring gear 82. It should, of course, be understood that the meshing of gears 94 and 104 provides for a first gear reduction whereas the meshing of gears 106 and 82 provides for second or additional gear reduction.

The drawing also shows that the coupling means for coupling driving shaft second portion 90 and motor output shaft 26 includes a splined hub portion 112 of a rotatable brake drum 110. The web portion 114 of brake drum 110 is located closely adjacent, but spaced from, gear box housing inner end portion 34. Brake drum 110 forms a part of a conventional and well-known type of drum brake 108 that utilizes internally expanding brake shoes 116 having a friction lining 118 that is forced against the inner annular surface 120 of brake drum 110. This type of friction brake construction, which forms no part of the present invention per se, utilizes a stationary backing plate 122 bolted to the outer side portion 30 of support member 14. Backing plate 122 serves to support stationary brake shoes 116 and also supports the usual actuating members, such as wheel cylinders (not shown) utilized in hydraulic drum brake operation. In addition, brake shoes 116 may also be mechanically actuated for parking and emergency brake use as is well-known in the art.

An essential part of the present invention is that drum 110 of integrated service and locking drum brake 108, which is arranged in a space-saving manner on motor output shaft 26 and driving shaft second portion 90, is simultaneously operating as a coupling. A snap or locating ring 124 which is located in recess 126 of brake drum hub portion 112, is confined between motor output shaft end face 28 and end face 92 of driving shaft second portion 90. It is the function of snap ring 124 to maintain brake drum 110 in the correct axial location, with shoulders 128 on driving shaft first portion 88 maintaining driving shaft 86 against bearing 76. The arrangement of drum brake 108, in the manner shown in the drawing, makes it possible to vent and adjust brake 108 from the inside of the vehicle without demounting lifting device 18 which is of importance since its points of suspension may enclose motor 20.

Figure 2:
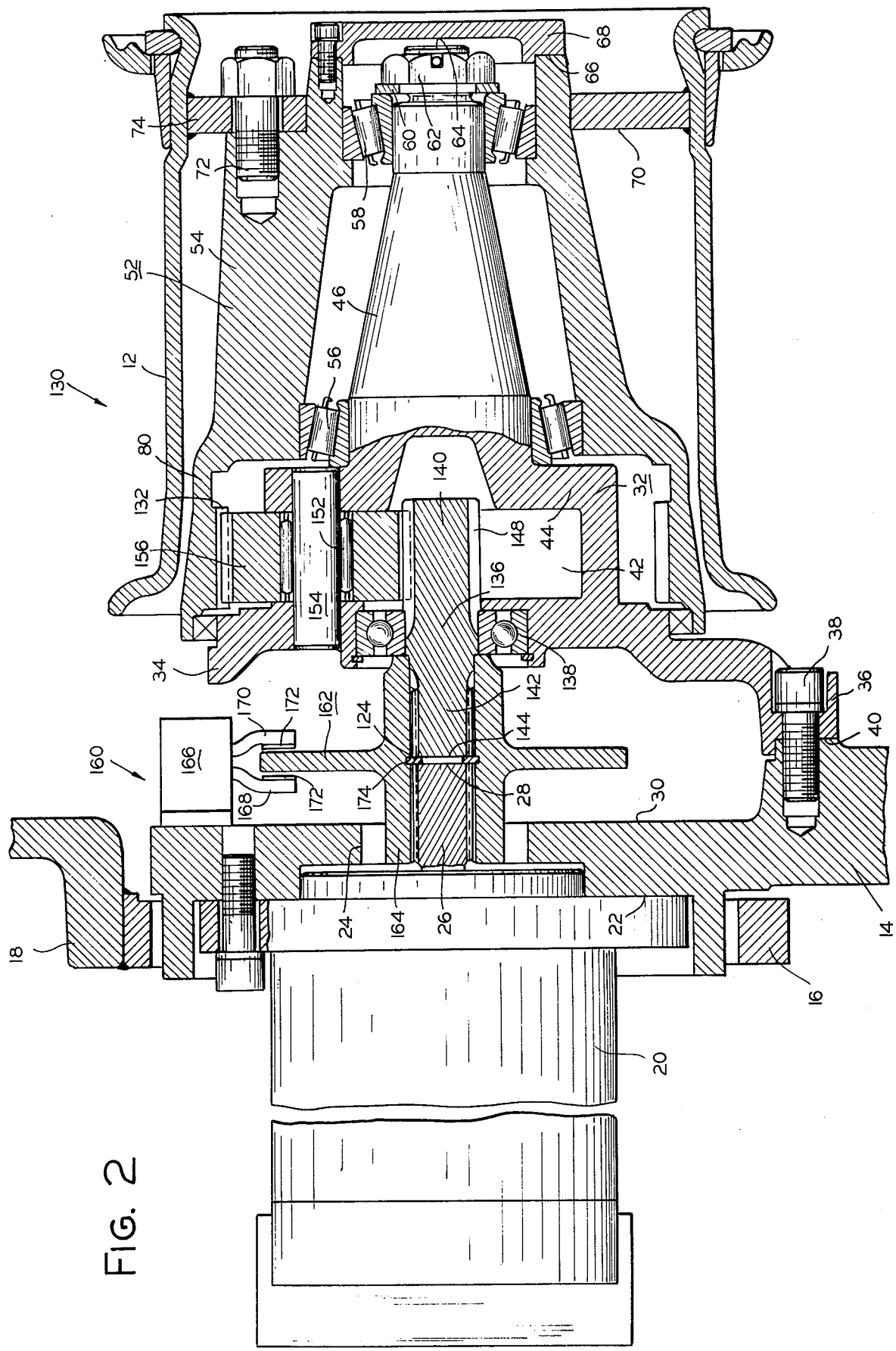
FIG. 2 is a cross-sectional view of another embodiment of the wheel drive mechanism of this invention wherein the motor drives the wheel through a planetary reduction gear.

Referring now to FIG. 2, there is shown another embodiment of this invention, with the reference numeral 130 generally denoting another wheel drive mechanism. To the extent that this mechanism is the same as previously described wheel drive mechanism 10 in FIG. 1, reference is made here to this preceeding description, with like reference numerals being applied to like parts.

Similar to wheel drive mechanism 10, mechanism 130 has a drive motor 20 preferably of the hydraulic type, securely mounted to the inner side 22 of frame or support member 14 and has its output shaft 26 extending through support member opening 24. Motor shaft end face 28 is located axially outwardly from the outer side portion 30 of support member 14.

As is the case with mechanism 10, mechanism 130 also includes a gear box housing 32, one end of which is bolted to support member 14, and has its outer end portion 44 narrowing down to an outwardly extending fixed spindle 46 coaxial with motor output shaft 26.

Rotary gear case 52 has a first hub portion 54 surrounding and rotatably mounted on spindle 46 and a second hub portion 80 that extends axially inwardly from first hub portion 54 and substantially surrounds gear box housing 32. Rotary gear case second hub portion 80 includes annular internal ring gear 132 whose function will be described in more detail later.

A driving shaft 136 is rotatably journalled by bearing 138 within gear box housing central cavity 42, with driving shaft 136 being coaxial with motor output shaft 26. Driving shaft 136 has a first portion 140 located within central cavity 42 and a second portion 142 extending axially outwardly therefrom for a distance sufficient that its end face 144 almost abuts end face 28 of motor output shaft 26. Driving shaft first portion 140 either has integrally therewith or attached thereto a drive or sun gear 148 whose function will be described in more detail shortly.

Also journalled within gear box housing central cavity 42, via bearings 152 on shafts 154, are three uniformly spaced (preferably 120° apart) planet pinion gears 156, only one of which is shown. Gears 156 are in mesh with both sun gear 148 and internal ring gear 132 and, of course, provide for a gear reduction between sun gear 148 and ring gear 132.

FIG. 2 also shows that the coupling means for coupling driving shaft second portion 142 and motor output shaft 26 includes a splined hub portion 164 of a rotatable brake disc 162. Brake disc 162 forms a part of a conventional and well known disc-type of friction brake 160 that also includes a caliper mechanism 166 secured to frame 14. Caliper mechanism 166 has caliper arms 168, 170 straddling the peripherial region of disc 162, with braking action being provided by the actuation of caliper mechanism 166 so as to move the caliper arms into braking engagement with the annular side surfaces of brake disc 162. Friction linings 172 are, of course, interposed between the caliper arms and brake disc 162 and may be attached to either the caliper arms or to brake disc 162. While the brake construction per se forms no part of the present invention, an essential part of the present invention is that brake disc 162 of disc brake 160, which is arranged in a space-saving manner on motor output shaft 26 and driving shaft second portion 142, is simultaneously operating as a coupling. Similar to the FIG. 1 embodiment, a snap or locating ring 124, which is located in recess 174 of brake disc hub portion 164, is confined between motor output shaft end face 28 and end face 144 of driving shaft second portion 142. Snap ring 124, of course, maintains brake disc 162 in the correct axial location relative to shafts 26 and 136.

It should of course, be understood that either type of brake construction, i.e. drum brake 108 or disc brake 160, could be utilized with either the multi-step gear reduction shown in FIG. 1 or the planetary gear reduction shown in FIG. 2.

The wheel drive mechanisms of this invention have all of their gearing mounted within the rim of the driving wheel and the concentric arrangement of the structural elements, such as motor 20, drum brake 108 or brake disc 162, driving shafts 86 or 136, spindle 46, rotary gear case 52 and wheel 12 avoid the radial loading of motor 20, thereby increasing the durability thereof.

Further advantages of these compact wheel drive mechanisms are in the areas of maintenance accessibility. The individual structural elements are readily servicable by demounting the following items:

1. Wheel 12 may readily be demounted from studs 72;
2. Wheel 12, together with rotary gear case 52 can be demounted by the removal of cover 68 as well as nut 62 and washer 60 — thus facilitating the maintenance of cluster gear 102 or planet gears 156;
3. Unscrewing of flange bolts 38 permits the demounting of gear box housing 32 and the ready removal of brake drum 110 or brake disc 162 as well as permitting the subsequent servicing and maintenance of the other brake components associated therewith; and
4. Motor 20 may be removed from support member 14 without disturbing either the remainder of the wheel drive mechanisms or lifting device 18.

The compact designs and constructions of the wheel drive mechanisms of this invention are particularly adapted for use in hydrostatic single-wheel drives for fork lift trucks where overall size and width dimensions are preferably kept to a minimum in order to provide maximum maneuverability in narrow aisles.

From the foregoing, it is believed that those familiar with the art will readily recognize and appreciate all the novel concepts and features of the present invention. Obviously, while the invention has been described in relation to only two preferred embodiments, numerous variations, changes and substitutions of equivalent will present themselves to persons skilled in the art and may be made without necessarily departing from the scope and principles of this invention. As a result, the embodiments described herein are subject to various modifications, changes and the like, with the scope of this invention being determined solely by reference to the claims appended hereto.

What is claimed is:
1. In a wheel drive mechanism mounted on a support member having an opening therethrough, the combination comprising:
   a. a drive motor mounted on one side of said support member and having an output shaft extending through said support member opening;
   b. a reduction gear box housing having a flange portion on one end thereof removably mounted on another side of said support member and having a stationary spindle outwardly extending from another end thereof and coaxial with said drive motor output shaft;
   c. a driving shaft rotatably journalled in said gear box housing, axially aligned with said motor output shaft, and having a first portion within said gear box housing and a second portion extending outwardly therefrom toward said drive motor output shaft;
   d. friction brake means, including a friction lining, for braking said wheel drive mechanism, arranged in a space-saving manner coaxially around said motor output and drive shafts and interposed between the said another side of said support member and the said one end of said gear box housing, with a rotatable member of said friction brake means also serving as means for continuously coupling together, for conjoint rotation, said drive shaft second portion and said motor output shaft;
   e. a rotary gear case having a first hub portion surrounding and rotatably mounted on said spindle, said first hub portion including means for mounting a wheel thereon, said gear case further including a second hub portion surrounding a substantial portion of said gear box housing, said second hub portion including an internal ring gear;
   f. a drive gear on said driving shaft first portion; and
   g. gear means rotatably journalled in said gear box housing and in mesh with both said driving shaft drive gear and said rotary gear case internal ring gear, whereby only said gear box housing need be removed from said support member in order to permit direct access to said friction brake means.

2. The combination of claim 1 wherein said friction brake means includes an internally expanding shoe type of drum brake and said rotatable member of said drum brake includes a brake drum having a central axial hub portion.

3. The combination of claim 2 wherein said means for coupling includes said hub portion of said brake drum.

4. The combination of claim 3 wherein said brake drum hub portion has an axial central bore, with said motor output shaft and said drive shaft second portion extending into said hub bore and drivingly engaging said drum hub.

5. The combination of claim 4 wherein said brake drum hub bore has an annular inner recess and an annular locating ring within said recess, said locating ring extending radially inwardly between the opposing end faces of said motor output shaft and said drive shaft second portion, thereby maintaining said brake drum in a predetermined axial location.

6. The combination of claim 2 wherein said brake drum has an open side portion and a web side portion, the latter being located closely adjacent to but spaced from said one end of said gear box housing.

7. The combination of claim 1 wherein said friction brake means includes a caliper type of disc brake and said rotatable member of said disc brake includes a brake disc.

8. The combination of claim 7 wherein said means for coupling includes the hub portion of said brake disc.

9. The combination of claim 8 wherein said brake disc hub portion has an axial central bore, with said motor output shaft and said drive shaft second portion extending into said hub bore and drivingly engaging said disc hub.

10. The combination of claim 9 wherein said brake disc hub bore has an annular inner recess and an annular locating ring within said recess, said locating ring extending radially inwardly between the opposing end faces of said motor output shaft and said drive shaft second portion, thereby maintaining said brake disc in a predetermined axial location.

* * * * *